(12) United States Patent
McPherson

(10) Patent No.: US 8,276,636 B2
(45) Date of Patent: Oct. 2, 2012

(54) CHEMICAL FUSION OF NON-METALLIC PIPE JOINTS

(75) Inventor: Terry R McPherson, Charlotte, NC (US)

(73) Assignee: IPS, Corporation-Weld-On-Division, Compton, CA (US)

( * ) Notice: Subject to any disclaimer, the term of this patent is extended or adjusted under 35 U.S.C. 154(b) by 909 days.

(21) Appl. No.: 12/045,565

(22) Filed: Mar. 10, 2008

(65) Prior Publication Data

US 2009/0014121 A1   Jan. 15, 2009

Related U.S. Application Data

(62) Division of application No. 11/089,222, filed on Mar. 24, 2005, now Pat. No. 7,341,285.

(60) Provisional application No. 60/555,923, filed on Mar. 24, 2004.

(51) Int. Cl.
*B29C 65/54* (2006.01)
*F16L 47/02* (2006.01)

(52) U.S. Cl. ............... 156/423; 285/294.3; 285/296.1

(58) Field of Classification Search .......... 156/423; 285/294.3, 294.4, 296.1
See application file for complete search history.

(56) References Cited

U.S. PATENT DOCUMENTS

| | | | | |
|---|---|---|---|---|
| 2,984,504 A | * | 5/1961 | Boughton | 277/623 |
| 3,960,394 A | * | 6/1976 | Hubner et al. | 285/296.1 |
| 4,523,779 A | * | 6/1985 | Knox | 285/294.3 |
| 4,647,080 A | * | 3/1987 | Sandt et al. | 285/296.1 |
| 4,670,207 A | | 6/1987 | Yamada et al. | |
| 4,688,829 A | | 8/1987 | Shioda et al. | |
| 5,022,685 A | * | 6/1991 | Stiskin et al. | 285/45 |
| 5,449,207 A | | 9/1995 | Hockett | |

(Continued)

FOREIGN PATENT DOCUMENTS

CA   1028376   3/1978

(Continued)

OTHER PUBLICATIONS

English language abstract and machine translation for JP 05-346189 A. Obtained from www.ipdl.inpit.go.jp. Date unknown.*

*Primary Examiner* — Michael Tolin
(74) *Attorney, Agent, or Firm* — Vidas, Arrett & Steinkraus, P.A.

(57) ABSTRACT

The invention is a pipe joint that is particularly suitable for joining pipes composed of materials having a low surface energy and excellent resistance to solvents. The major components are an extrudable adhesive; a first pipe having a socket with an inside diameter, where said socket has a mouth, a self-centering bottom, and a substantially cylindrical wall with an inlet, an outlet, and an inner annular channel; a second pipe having an insertion section with an end and an outer annular channel, said second pipe having an outside diameter that is less than the inside diameter of the socket, where the difference in diameters defines a cap and where the outer annular channel lines up with the inner annular channel therein forming an interlocking keyway; and a flanged annular ring, where said annular ring has an inside diameter that enables it to be slid over the second pipe and a thickness that is comparable to the gap, and where the flange has a width that is sufficient to cap the mouth of the socket. When fully formed, the adhesive has changed to a solid material that substantially fills the gap and the interlocking keyway, and serves as a mechanical key in the interlocking keyway. The adhesive is preferably an alkyl borane adhesive.

11 Claims, 6 Drawing Sheets

U.S. PATENT DOCUMENTS

| | | |
|---|---|---|
| 5,486,024 A | 1/1996 | Dierdorf |
| 5,795,657 A | 8/1998 | Poicus et al. |
| 5,887,909 A | 3/1999 | Tokuda |
| 6,383,655 B1 | 5/2002 | Moren |
| 6,436,224 B1 | 8/2002 | Nishimura et al. |
| 6,777,512 B1 * | 8/2004 | Sonnenschein et al. ...... 526/196 |
| 2003/0044553 A1 | 3/2003 | Ramanathan et al. |
| 2003/0047268 A1 | 3/2003 | Korchnak et al. |
| 2006/0191623 A1 | 8/2006 | Lutz et al. |
| 2006/0266476 A1 | 11/2006 | Sehanobish et al. |

FOREIGN PATENT DOCUMENTS

| | | |
|---|---|---|
| JP | 5-346189 A * | 12/1993 |
| WO | WO 2005/017006 A1 * | 2/2005 |

* cited by examiner

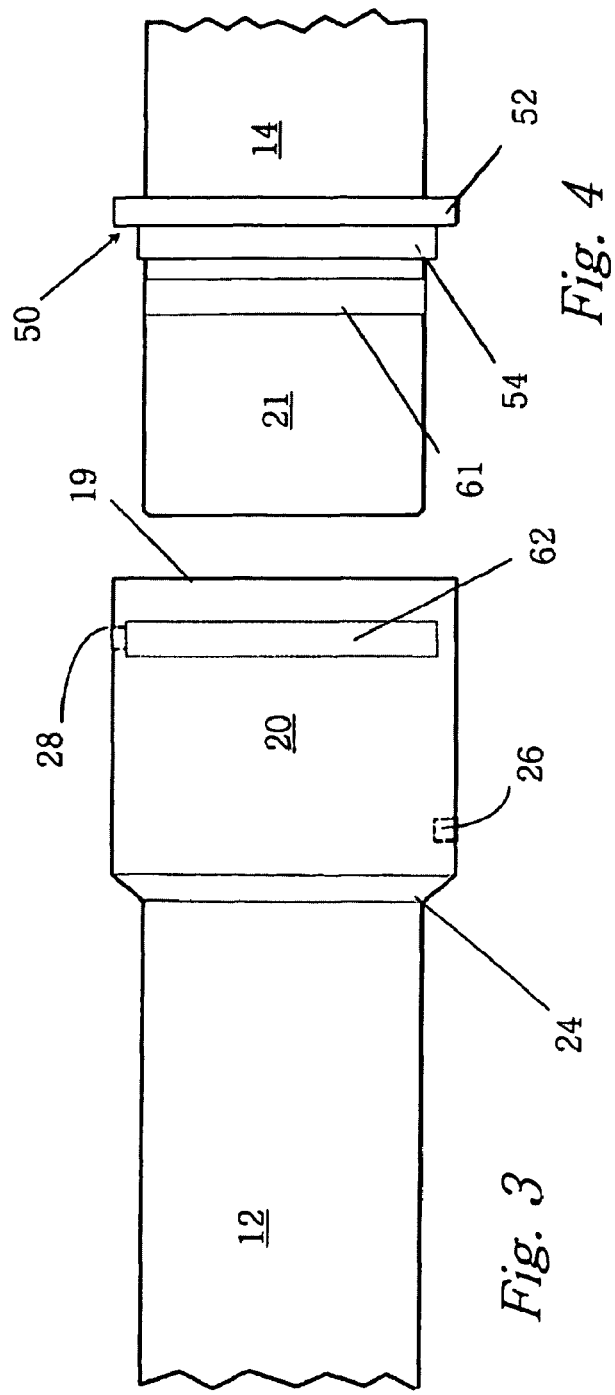
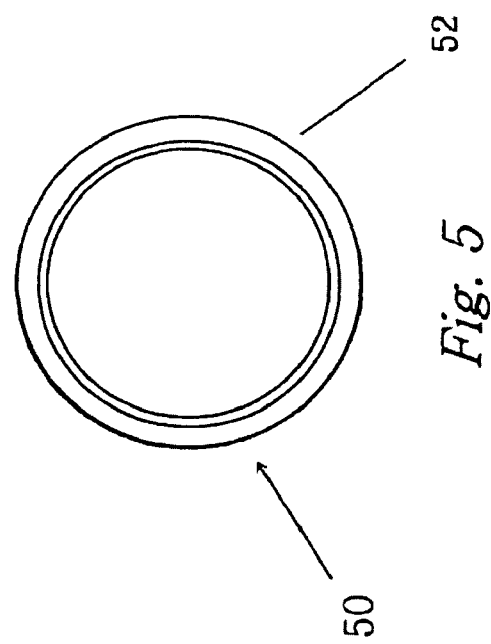

CHEMICAL FUSION OF NON-METALLIC PIPE JOINTS

CROSS REFERENCE TO RELATED PATENT APPLICATION

The application is a divisional application stemming from the patent application Ser. No. 11/089,222 filed on Mar. 24, 2005, now U.S. Pat. No. 7,341,285, which claims the benefit of the priority filing date of the provisional patent application Ser. No. 60/555,923, filed on Mar. 24, 2004.

BACKGROUND OF THE INVENTION

1. Field of the Invention

The invention relates generally to a method for joining pipes, and more particularly to a method and a system for joining pipes comprised of low surface energy materials, such as HDPE (high density polyethylene), PEX (cross linked polyethylene), and PVDF (polyvinylidene difluoride). Low energy surface materials are generally to be referred to as olefinic materials within the scope of the disclosure and claims of this application.

2. Prior Art

A process called chemical fusion (employing an adhesive) is used to join olefinic plastic pipes comprised of low surface energy materials, such as HDPE (high density polyethylene), PEX (cross linked polyethylene), and PVDF (polyvinylidene difluoride). Olefinic plastic pipes such as those previously mentioned cannot be joined using the same technology to join, for instance, PVC, ABS and CPVC pipes. Pipes made of PVC or ABS or CPVC are typically joined using a solvent cement, where a solvent cement is a solution, emulsion or dispersion of the respective polymer in a volatile etching solvent. An example of a volatile etching solvent is a blend of THF, toluene, MEK. The solvent etches the surface of the pipe, and then dries leaving a coating of the cement and a partial fusion of the surfaces of the joined pipes. When olefinic pipes, such as those previously described, are attempted to be adhered in a similar fashion, the joint bond is unsatisfactory. The low surface energy olefinic plastics are resistant to solvent etching, and the residual adhesive cement does not satisfactorily adhere the two surfaces. Olefinic pipes are typically joined using mechanical means, such as threaded ferrule couplers, Victaulic couplings (e.g. clamps), or joined using heat fusion. With heat fusion, a current is induced in a wire coated with an appropriate olefinic material. The coated wire is wrapped around the pipe, between the inserting pipe section and the socket joint. The wire is inductively heated, which causes the olefinic coating to melt and fuse with the olefinic pipe.

A review of various alkyl borane adhesive systems as they relate to forming pipe joints follows.

U.S. Pat. No. 5,795,657 discloses a two part acrylic adhesive using an organo borane polyamine complex. Various organo borane polyamines, admixed with an oligomeric blend of acrylics, are tested against polyethylene, polyproplene, and Teflon.

In 3M's U.S. Pat. No. 6,383,655, they further address adhesives suitable for low energy surfaces, where the adhesives cure at room temperature. A low energy surface is defined as having a surface energy less than 45 mJ/m.sup.2, more typically less than 40-45 mJ/m.sup.2, or less than 35-40 mJ/m.sup.2. Cited as examples are polyethylene, polypropylene, acrylonitrile-butadiene-styrene, polyamide and fluorinated polymers such as polytetrafluoroethylene (Teflon™). Using the system described in U.S. Pat. No. 6,383,655, the adhesive is cured at room temperature. The substrates tested were polypropylene, polytetrafluoroethylene and high-density polyethylene. Over lap shears for the high-density polyethylene were up to 700 psi and 800 psi for the polypropylene. Over lap shear for fluorinated polyethylene was reported anywhere from 160 to 350 psi. The amines used in U.S. Pat. No. 6,383,655 were substantially shorter than the amines used in U.S. Pat. No. 5,795,657, suggesting that greater cross-linking probably occurred, and that the cohesive force of the adhesive is higher. Anticipated applications mentioned include adhesives, bonding materials, sealants, coatings, and injection molding resins. The disclosed adhesive systems may also be used as matrix resins in conjunction with glass, carbon, and metal fiber mats, such as those used in resin transfer molding operations. They also may be used in encapsulants, potting compounds, electrical components, printed circuit boards, and the like. There was no mention of the use of the adhesive for adhering pipe joints. Of interest is that when using the described adhesive system, they (3M.) found it useful to add a thickener such as polybutyl methacrylate (col 11, line 56). This is in contrast to a potential issue for the instant invention, in that a low viscosity adhesive is desired.

U.S. Pat. No. 4,670,207 addresses a number of issues associated with joining olefinic pipe using a socket joint bonding method. According to the reported prior art, wherein the walls of socket and pipe are substantially straight, the insertion of the pipe into the socket produces a bead of adhesive that is expressed outward, and also produces a bead of adhesive that is forced inward. The inward bead can actually partially occlude the pipe, but more importantly is a potential source for contamination. A purported solution to the problem is using a socket and pipe insert where both have tapered walls. Reputedly, the tapering prevents expressing a bead of adhesive when the pipe is inserted into the socket. Reportedly, tapering the inner circumferential surface of the socket portion of the joint and the outer circumferential surface of the end portion of the pipe results in higher bonding pressure, and consequently a high bond strength can be obtained. While the tapering may help in aligning the pipes, in fact, it still would not solve the problem of keeping the end of the inserted pipe coaxial (concentric) with the socket joint, which is a feature of the invented unique pipe joint.

U.S. Pat. No. 5,449,207 is included to show that the concept of using adhesive delivery systems to pump the adhesive into the joint has previously been addressed. While not explicitly showing a similar type of coupling device, nor the use of a similar adhesive (alkyl borane adhesive), the patent does illustrate the use of an extruded adhesive.

U.S. Pat. No. 4,688,829 is included only to illustrate in a very general way a means of aligning the inserting pipe concentrically into the socket joint. In FIG. 3 of U.S. Pat. No. 4,688,829, there is a first annular ring 12 and a second annular ring 13, which align 7 the inserting pipe into 4, the socket joint.

In U.S. Pat. No. 6,436,224, Nishimura describes a silicon compound used in a solvent, typically toluene, to augment electro fusion (EF, which is another name for heat fusion). The silicon compound acts somewhat like a flux and a sealant. It is especially useful if the pipe has becomes oxidized or surfaces are contaminated with sand or some other loose material which prevents successful electro fusion.

Dow chemical has a pair of published patent applications (US Publication 2003/0047268A1 and 2003/0044553A1) on file that utilize alkyl borane adhesives. The applications discuss the adhesive composition, as they relate to methods to repair fuel tanks.

In Canadian Patent 1,028,376 to Silver et al., Silver teaches a pipe joint having a male joint member and a female joint member, where the end of the male member is tapered and the receiving female member necks down. The two are joined with what approximates a press fit at the male end. The mouth has a ferrule shaped flanged annular cap.

What is needed is a pipe joint suitable for joining pipe joints that hereto before have not been successfully joined using conventional pipe non-metallic pipe cements.

Further, what is needed is a pipe joint that can employ very high solids adhesives, as solvent based adhesive systems produce air emissions, which are progressively being regulated out of existence.

SUMMARY OF THE INVENTION

The invention, in the broadest sense, is a pipe joint that is particularly suitable for joining non-metallic pipes. Examples of non-metallic materials used in the fabrication of pipes are PVC, chlorinated PE, vinyl acetate, PVDC, CPVC, silicone, ABS, acrylic polymers, fluorinated polymers such as PVDF (polyvinylidene difluoride), EPDN, and olefinic pipe materials. Olefinic pipes are commonly formed from HDPE, PEX (e.g., cross-linked polyethylene, a.k.a., ionomers), polypropylene and PTFE (e.g., polytetrafluoroethylene). As discussed in the Background, joining non-metallic pipes with an adhesive is especially difficult for olefinic pipes, as these pipes are comprised of low surface energy polymers that are substantially impervious to solvents.

The invention is a pipe joint that is suitable for use with adhesives that can be dispensed with little or no solvent. The invented joint does not require an adhesive to etch the surface of the pipes, nor an adhesive that effects fusion of the materials by solvation nor by thermal melting. The joint is suitable for high or 100% solids formulations, where the adhesive has one or more parts. For instance, a hot melt adhesive is a 100% solids formulation that is one part adhesive, cyanoacrylates are one-part acrylate adhesives that cure on contact with mated surfaces through a reaction with surface moisture, and epoxy adhesive, urethane or alkyl borane adhesives are typically two-parts adhesives dispensed at 100% solids. In general, the invention is a pipe joint having a male joint member and a female joint member, where the members are joined either as a pipe insertion section and a pipe socket, or as coupled pipe sockets, where each socket is joined with a pipe insertion section, or any other combination of pipe end and a pipe socket that effects a joint of this genre. The joint can be linear or angular.

The pipe joint is comprised of: an extrudable adhesive; a first pipe having a socket with an inside diameter, where the socket has a mouth, a self-centering bottom, and a substantially cylindrical wall with an inlet, an outlet, and an inner annular channel; a second pipe with an insertion section having an end and an outer annular channel, where said second pipe has an outside diameter that is less than the inside diameter of the socket, where the difference in diameters defines a gap, and where the outer annular channel aligns with the inner annular channel therein forming an interlocking keyway; a flanged annular ring, where said annular ring has an inside diameter that enables it to be slid over the second pipe and a thickness that is comparable to the gap, and where the flange has a width that is sufficient to cap the mouth of the socket; and where, when the joint is fully formed, the adhesive has changed to a solid material that substantially fills the gap and the interlocking keyway, and serves as a mechanical key in the interlocking keyway.

With aligned annular channels filled with adhesive, the adhesive forms an in situ key, therein producing an adhesive joint that is a combination of a mechanical and an adhesive joint. The mechanistic combination reduces the shear stress between the adhesive and the pipe, and assures that even under conditions where there is shear failure, that the pipes will still remain joined, and the joint will continue to function. The annular channels also create an avenue for the extruded adhesive to distribute evenly around the circumference of the pipe end, and then flow toward longitudinally filling the gap. The channels serve to express entrained air and act as a reservoir, which can supply the adhesive over a much longer route than would be available if channeled through the inlet port directly into the gap.

BRIEF DESCRIPTION OF THE DRAWINGS

The foregoing and other objects will become more readily apparent by referring to the following detailed description and the appended drawings in which:

FIG. 3 is a side view of the first pipe having a socket;

FIG. 4 is a side view of the second pipe with an insertion section having an end. The insertion section is fitted with a flanged annular ring;

FIG. 5 is a bottom view of the flanged annular ring;

DETAILED DESCRIPTION OF THE INVENTION

Figure 1:
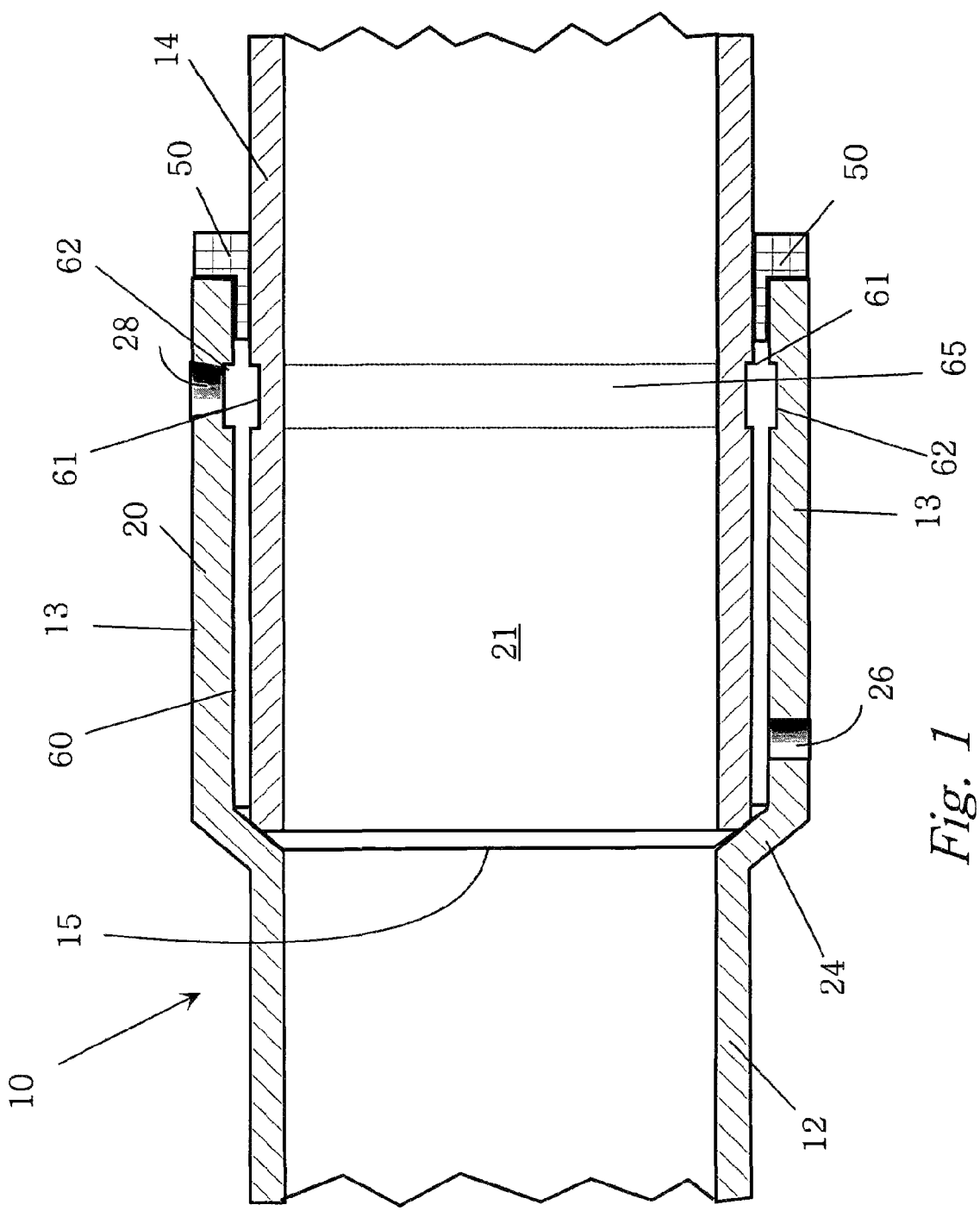
FIG. 1 is longitudinal cross-sectional view of the invented pipe joint.

The invention, as illustrated in the drawings is a pipe joint 10. Referring to FIG. 1, the joint 10 has a first pipe 12 having a socket 20 with an inside diameter, where the socket 20 has a mouth 19 (as shown in FIG. 5), a self-centering bottom 25, and a substantially cylindrical wall 13 with an inlet 28, an outlet 26, and an inner annular channel 62 (also shown in ghost in FIG. 3); a second pipe 14 with an insertion section 21 having a squared-off end 15 and an outer annular channel 61, where said second pipe has an outside diameter that is less than the inside diameter of the socket 20, where the difference in diameters defines a gap 60 and where the outer annular channel 61 aligns with the inner annular channel 62 therein forming an interlocking keyway 65. The inner annular channel 62 and the outer annular channel 61 are substantially deformations in the wall of the socket or the insertion section, respectfully, where a portion of the wall is cutaway or molded into the piece. A flanged annular ring 50 centers the insertion section 21 of the pipe 14. As can be seen in FIG. 4 and FIG. 5, the flanged annular ring 50 has an inside diameter that enables it to be slid over the second pipe 14 and a thickness 54 that is comparable to the gap 60. The flange 52 of the flanged annular ring 50 has a width that is sufficient to cap the mouth 19 of the socket 20.

Figure 2:
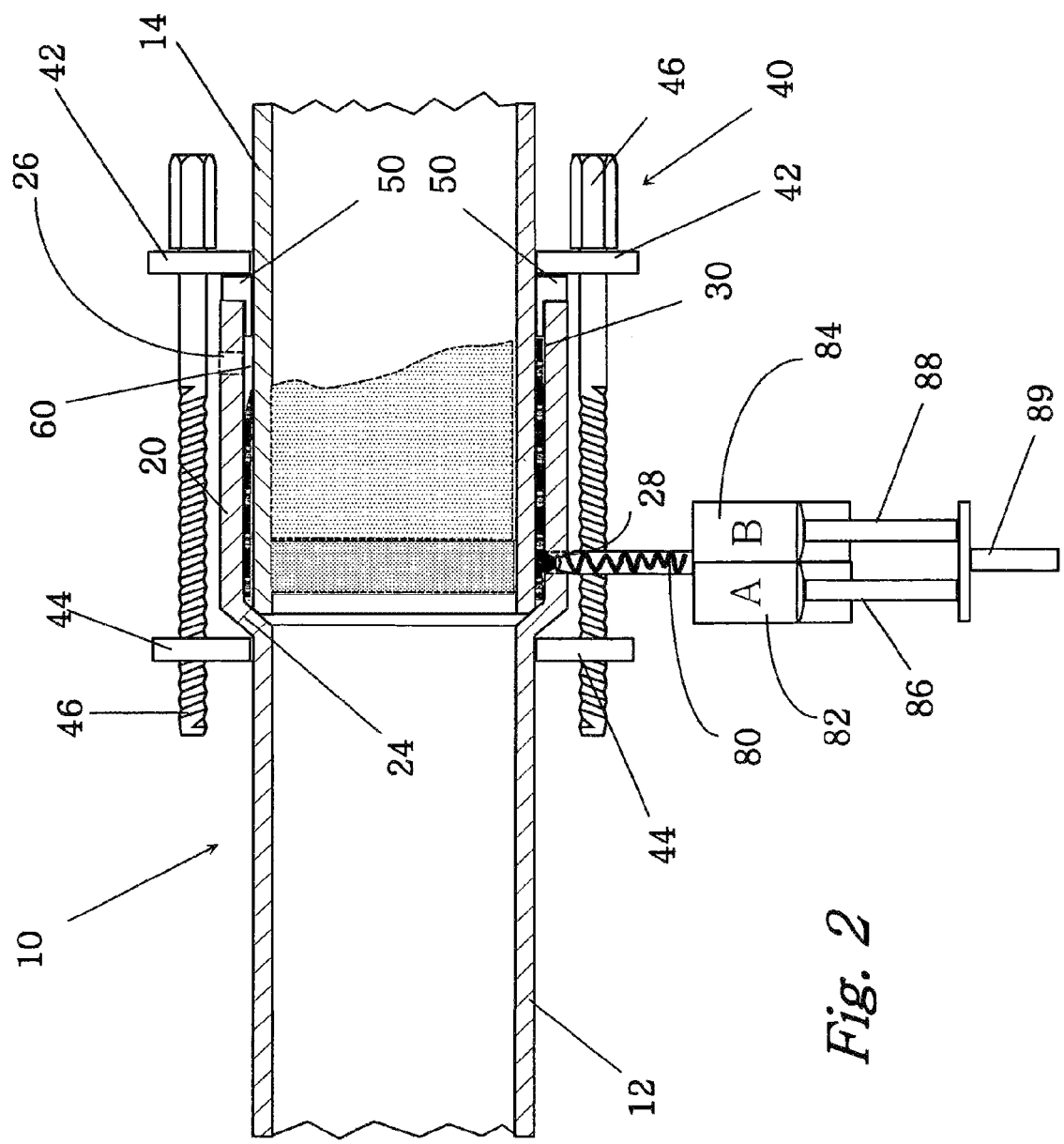
FIG. 2 is longitudinal cross-sectional view of the pipe joint as it is being filled with an extrudable adhesive. The joint is secured with a clamp.

Referring to FIG. 2, the adhesive 30 is extrudable, and as shown in the figure the adhesive is inserted into the inlet 28 and exits the outlet 26. In the illustrated embodiment, the inlet and outlet are arbitrarily selected, and the inlet and outlet are reversed from the other figures. The adhesive 30 flows fastest through the channels forming the interlocking keyway 65, and then is distributed longitudinally toward the outlet. In FIG. 2, the adhesive is a two-part adhesive, A and B, which are mixed as they are extruded in mixing tube 80. The A part is stored in barrel 82, and the B part in barrel 84. Plungers 86 and 88 are actuated by the mechanical pump having piston 89.

Figure 6:
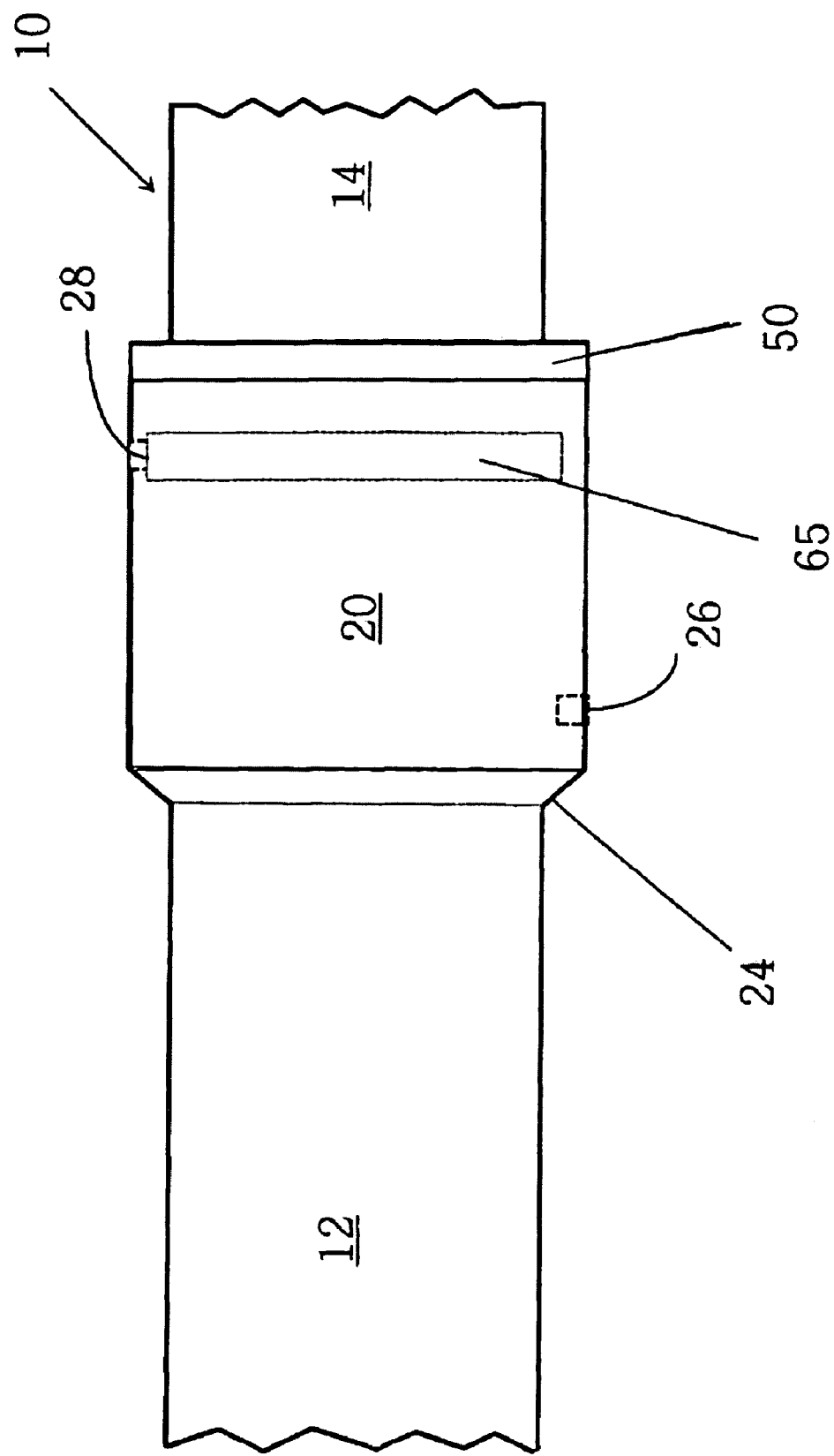
FIG. 6 is perspective side view of the invented pipe joint, wherein an interlocking keyway is shown in ghost.

FIG. 6 illustrates the invented pipe joint, wherein the interlocking keyway 65 is shown in ghost. In FIG. 6 the interlocking keyway 65 closer to the mouth of the socket 20. The adhesive is retained by the flanged annular ring 50.

Figure 7:
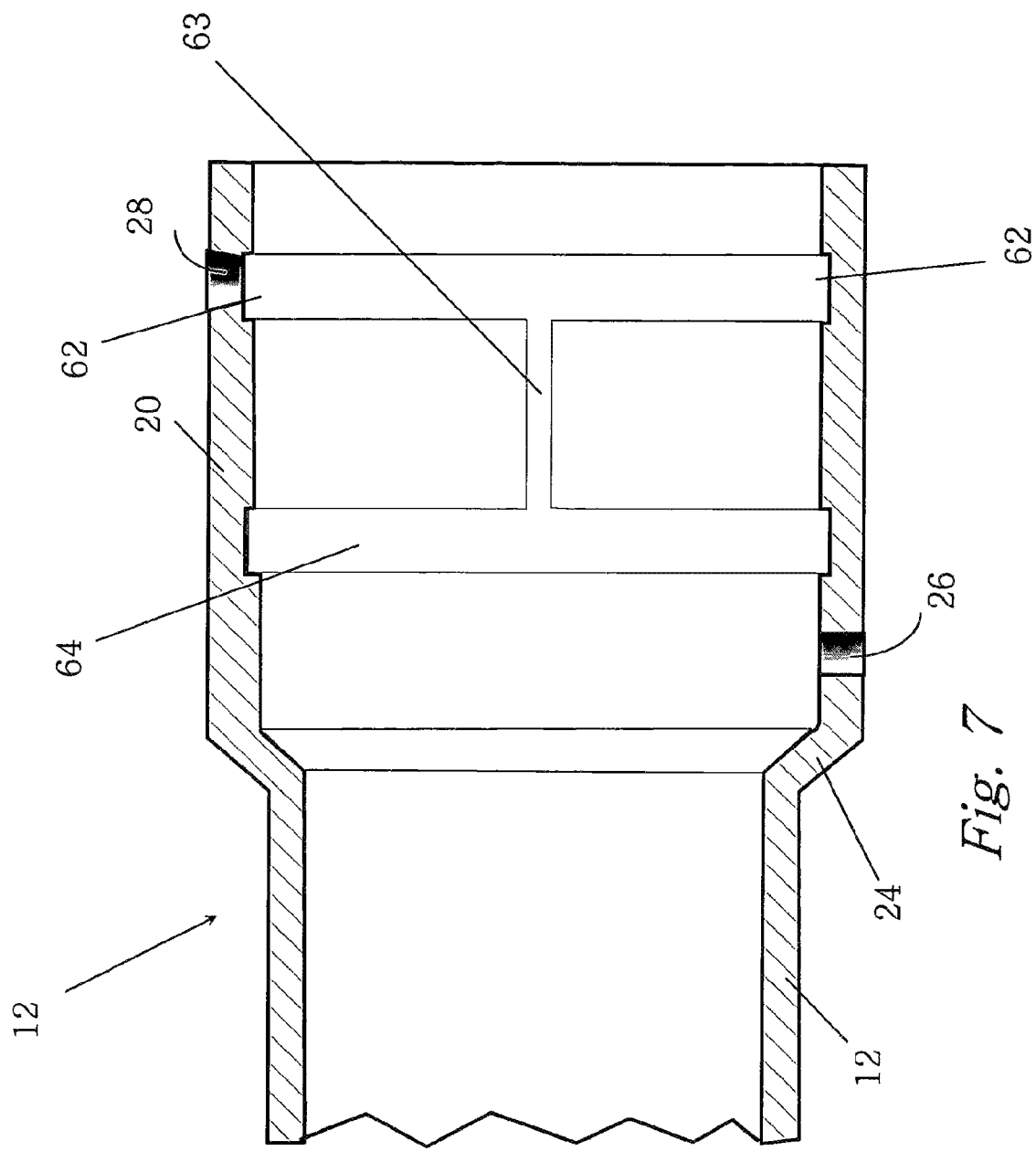
FIG. 7 is longitudinal cross-sectional side view of the first pipe and socket, where the socket has two annular channels.

FIG. 7 is longitudinal cross-sectional side view of a socket that has multiple inner annular channels. There is the channel 65 positioned adjacent to the inlet 28, a second channel 64 closer to the bottom 24, and a longitudinal channel 63. The second annular channel helps to redistribute the adhesive evenly throughout the gap, and if there is a corresponding outer annular channel on the insert section of the second pipe, then a second interlocking keyway is formed.

Figure 8:
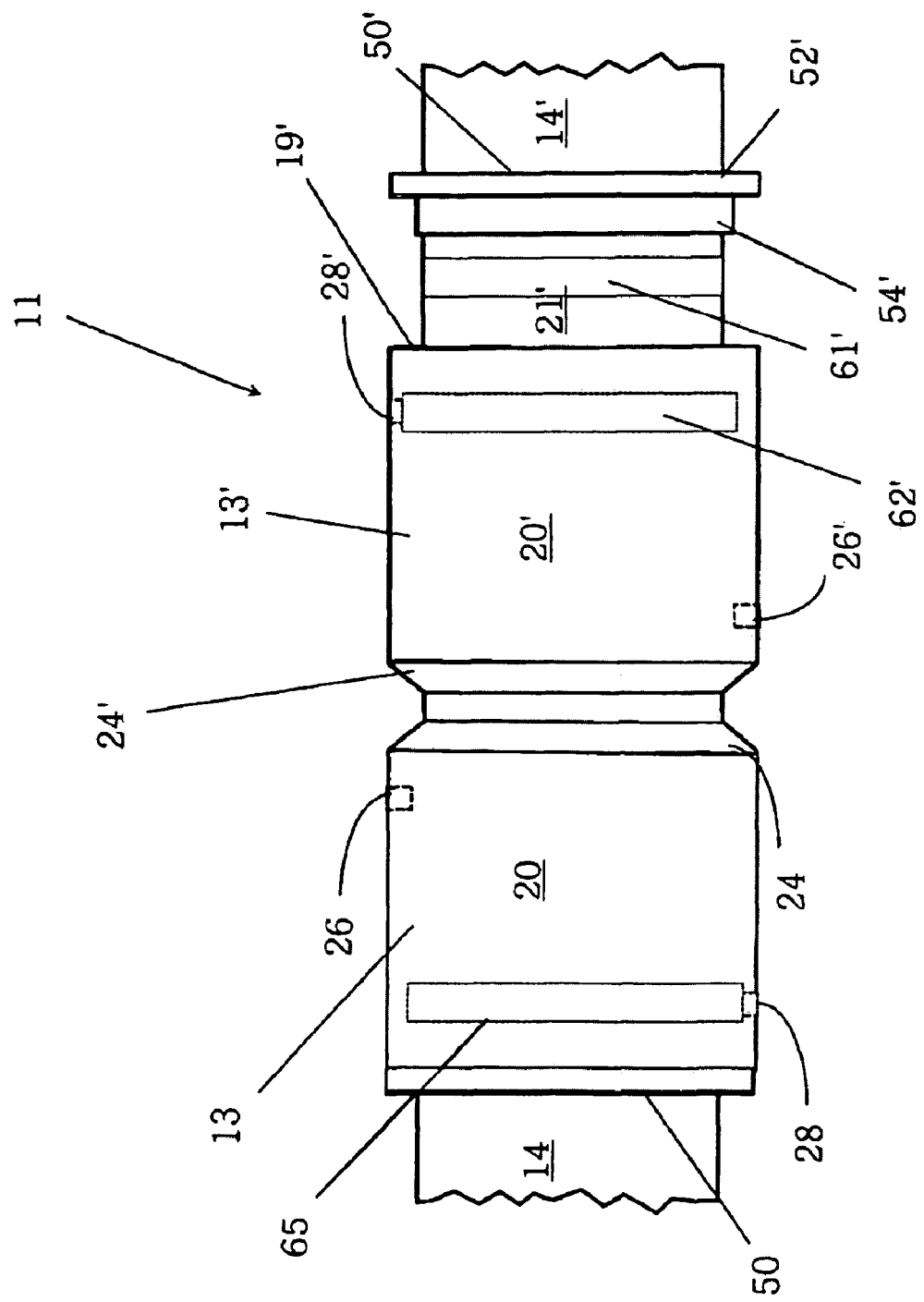
FIG. 8 is a side view a coupling joint, where two socket are coupled, and each socket is joined to a pipe.

FIG. 8 is a side view of a coupling joint 11, where two sockets are coupled, and each socket is joined to a pipe. The coupling joint 11 is comprised of an extrudable adhesive (not shown); a first socket 20 having an inside diameter, where said first socket has a mouth (not labeled), a self-centering bottom 24, and a substantially cylindrical wall 13 with an inlet 28, an outlet 26, and an inner annular channel (not shown). There is also a second socket 20' having an inside diameter, where said second socket has a second mouth 19', a second self-centering bottom 24', and a second substantially cylindrical wall 13' with a second inlet 28', a second outlet 26', and a second inner annular channel 62'. The first and second sockets (20 and 20') are coupled at an angle from 45 to 180 degrees. Additionally, there is a pipe 14 having an insertion section (not visible) with a squared-off end and an outer annular channel. The pipe has an outside diameter that is less than the inside diameter of the first socket, where the difference in diameters defines a first gap and where the outer annular channel lines up with the inner annular channel thereby forming a first interlocking keyway (65 shown in ghost). There is also a second pipe 14' having an insertion section 21' with a squared-off end and a second outer annular channel 61', where said second pipe 14' has a second outside diameter that is less than the inside diameter of the second socket 20", where the difference in diameters defines a second gap (not visible) and where the second outer annular channel 61' lines up with the second inner annular channel 62' (shown in ghost), therein forming a second interlocking keyway (not shown). The first flanged annular ring 50, where said annular ring has a first inside diameter that enables it to be slid over the pipe and a thickness that is comparable to the first gap, and where the first flange has a width that is sufficient to cap the mouth of the first socket. There is a second flanged annular ring 50', where said second annular ring has a second inside diameter that enables it to be slid over the second pipe and a thickness 54' that is comparable to the second gap, and where the second flange has a width 52' that is sufficient to cap the mouth of the second socket 20'. When the coupling joint 11 is fully formed, the adhesive has changed to a solid material that substantially fills the gap and the first interlocking keyway 65, and serves as a first mechanical key in the first interlocking keyway. When other end of the coupling joint 11 is fully formed, the adhesive has changed to a solid material that substantially fills the gap and the second interlocking keyway, and serves as a second mechanical key in the second interlocking keyway.

The invention is furthermore a system for joining olefinic pipes. The system comprises an extrudable alkyl borane adhesive having a solids content that is greater than or equal to 90% solids by weight; a means for delivering the adhesive; a first pipe having a socket with an inside diameter, where said socket has a mouth, a self-centering bottom, and a substantially cylindrical wall with an inlet, an outlet, and an inner annular channel; a second pipe having an insertion section with an end and an outer annular channel, said second pipe having an outside diameter that is less than the inside diameter of the socket, where the difference in diameters defines a gap and where the outer annular channel lines up with the inner annular channel therein forming an interlocking keyway. Additionally, there is a flanged annular ring, where the annular ring has an inside diameter that enables it to be slid over the second pipe and a thickness that is comparable to the gap, and where the flange has a width that is sufficient to cap the mouth of the socket; wherein said flanged annular ring can slide onto the second pipe with the flange away from the end; wherein the second pipe can be inserted into the socket so the end rests on the bottom of the second pipe; wherein the bottom self-centers the end of the insertion section, and the flanged annular ring, slipped down such that the flange is flush with the mouth of the socket, centers the insertion section in the socket and caps the gap. The means of delivering the adhesive is positioned at the inlet, and the adhesive is injected into the gap, filling the gap, and overflowing out the outlet.

The adhesive is selected so that it cures at room temperature in an acceptable time frame. The adhesive is typically a two-part adhesive that is mixed inline, as with a static mixer, as it is injected into the pipe joint. After curing the clamp is removed.

The invented system is suitable for joining olefinic pipes using alkyl borane low surface energy adhesives. The disclosed unique pipe joint precisely defines the thickness (not viscosity) of the adhesive. Other aspects of the invented system include a means for delivering the adhesive, and a clamp that is used in conjunction with the unique pipe joint.

Applicant has observed that there is a correlation of adhesive failure to the thickness of the adhesive. Without control over the adhesive thickness, the mode of failure is by cohesive failure, as measured by lap shear tests. When the adhesive layer becomes too thick there is a lower threshold of performance in adhering pipe joints. By employing a pipe joint that has created an in situ mechanical key, the joint is much less sensitive to small changes in the adhesive thickness that can arise naturally from the pipes being out-of-round.

Furthermore, Applicant has determined that if the adhesive thickness is controlled with a given range, then an acceptable adhesive bond can be attained that is suitable for high end performance applications, however as the pipe diameter becomes larger, it is more difficult to maintain these tolerances, and the disclosed invention overcomes these limitations.

Alkyl borane adhesives have been found to be suitable for joining olefinic pipe, pipe joints that are suitable for adhering using a chemical means, and joint systems that employ alkyl borane adhesives and specialized joints. Many of these adhesive compositions are pyrophoric in the presence of oxygen.

The preferred alkyl borane adhesives are a blend of acrylics used in conjunction with an alkyl borane. Reportedly, there are a number of adhesive systems that are suitable for bonding low energy surfaces. Among the more prominent systems are the alkyl boranes, also known as boron alkyls, also known as organo boranes. In these adhesive systems, the alkyl borane acts as a catalyst for the polymerization of oligomers, diluent monomers and cross-linking promoters additives, as well as co-accelerators like amines which speed up the polymerization. In general, alkyl boranes are widely reported in the literature as catalyst for the polymerization of alkenes (i.e. ethylene, propylene, 1-hexene, and to a lesser extent isoproprenes, styrenes and vinyl acetates, and butadiene). These systems generally require substantial heat and often are gas phase reactions. The adhesives of interest for the invention are lower temperature curing systems, and preferably would cure around room temperature, and would have a Tg that is low enough that the adhesive does not embrittle.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A system for joining pipes comprising:
an extrudable adhesive that solidifies after it has been extruded, said extrudable adhesive having a solids content that is greater than or equal to 90% solids by weight;
a first pipe having a socket with an inside diameter, said socket having a mouth that is an open end of the socket, a self-centering bottom and a substantially cylindrical wall, the substantially cylindrical wall having an inlet, an outlet, and an inner annular channel aligned with only one of the inlet and the outlet, wherein the inlet enables flow of the extrudable adhesive through the cylindrical wall, and the outlet allows entrained air to be expressed;
a second pipe, the second pipe having an insertion section with a length, an outer annular channel and an end, where said insertion section of the second pipe is inserted into the socket of the first pipe, said second pipe having an outside cylindrical diameter that is less than the inside diameter of the socket, where the difference in diameters defines a gap and where, when inserted, the outer annular channel and the inner annular channel are in fluid communication with the inlet; and
a flanged annular ring, the annular ring having an inside diameter sufficiently large to slide over the second pipe, a thickness that sets a uniformity of the gap, and a flange with a width sufficient to cap the mouth of the socket, wherein said flanged annular ring is slidable onto the second pipe with the flange away from the open end of the socket;
wherein when the insertion section of the second pipe is inserted into the socket of the first pipe, so the end of the insertion section abuts the self-centering bottom of the first pipe, the self-centering bottom of the first pipe aligns the end of the second pipe, and the inner annular channel is aligned with the outer annular channel, wherein the flanged annular ring is positioned against the mouth of the socket and the annular ring is clamped into the gap so that the flange is flush with the mouth of the socket, thereby centering the full length of the insertion section in the socket and providing an unadhered pipe assembly prepared to receive the adhesive;
wherein the extrudable adhesive is delivered to the unadhered pipe assembly using an extruding apparatus that can connect to the inlet and extrude the adhesive; wherein the extrudable adhesive is injected through the inlet and substantially fills the gap, wherein the inner annular channel and the outer annular channel together create an avenue for the extruded adhesive to distribute evenly around the circumference of the insertion section, and then flow longitudinally filling the gap and ultimately forming an interlocking keyway; and then the extruding apparatus is disconnected from the inlet, and the extruded extrudable adhesive becomes a strong solid adhesive which fixedly joins the pipes both adhesively and mechanically.

2. The system for joining pipes according to claim 1, wherein said outlet is in fluid communication with the gap at a point distal to the inlet.

3. The system for joining pipes according to claim 1, wherein the self-centering bottom of the socket has a positive seal between the end of the insertion section of the second pipe and the bottom of the socket of the first pipe.

4. The system for joining pipes according to claim 3, wherein the positive seal comprises another annular ring seated proximate to the bottom of the socket of the first pipe.

5. The system for joining pipes according to claim 1, further comprising a temporary clamp that secures the insertion end, the socket and the flanged annular ring as the adhesive is extruded and until the adhesive has solidified.

6. The system according for joining pipes according to claim 5 wherein the clamp exerts force axially between the socket and the flanged ring.

7. The system for joining pipes according to claim 1, wherein the extrudable adhesive is selected from the group consisting of: hot melt adhesives, cyanoacrylate adhesives, epoxy adhesives, urethane adhesives, boron catalyzed adhesives, free radical and high solids adhesives.

8. The system for joining pipes according to claim 1, wherein the extrudable adhesive is a high solids adhesive containing a boron catalyst including alkyl boranes, boron alkyls, organo boranes and the like, where said extrudable adhesive adheres low energy surfaces, low surface energy pipe and olefinic pipe.

9. The system for joining pipes according to claim 1, wherein the extrudable adhesive is a two part adhesive suitable bonding low energy surfaces, low surface energy plastic pipe and olefinic pipe selected from the group consisting of a two part epoxy adhesive, a two part urethane adhesive, a two part free radical adhesive, a two party acrylic adhesive containing a catalyst, and combinations thereof.

10. The system for joining pipes according to claim 1, wherein said first pipe and said second pipe are comprised of an olefinic pipe material having a low surface energy and excellent resistance to solvents.

11. The system for joining pipes according to claim 10, wherein the olefinic pipe material is selected from the group consisting of: HDPE (high density polyethylene), polypropylene, PEX (cross linked polyethylene), and PVDF (polyvinylidene difluoride).

* * * * *